(12) United States Patent
Emanueli et al.

(10) Patent No.: US 11,150,572 B2
(45) Date of Patent: Oct. 19, 2021

(54) IMAGING AND PRINTING SYSTEM

(71) Applicant: HEWLETT-PACKARD INDIGO B.V., Amstelveen (NL)

(72) Inventors: Ron Emanueli, Rehovot (IL); Michael Plotkin, Rehovot (IL); Haim Livne, Kefar Sava (IL); Napoleon J. Leoni, San Jose, CA (US)

(73) Assignee: HP Indigo B.V., Amstelveen (NL)

( * ) Notice: Subject to any disclaimer, the term of this patent is extended or adjusted under 35 U.S.C. 154(b) by 442 days.

(21) Appl. No.: 15/523,184

(22) PCT Filed: Jan. 22, 2015

(86) PCT No.: PCT/US2015/012518
§ 371 (c)(1),
(2) Date: Apr. 28, 2017

(87) PCT Pub. No.: WO2016/118147
PCT Pub. Date: Jul. 28, 2016

(65) Prior Publication Data
US 2017/0329252 A1    Nov. 16, 2017

(51) Int. Cl.
*G03G 15/043* (2006.01)
*G02B 26/12* (2006.01)
(Continued)

(52) U.S. Cl.
CPC ........... *G03G 15/043* (2013.01); *G02B 26/12* (2013.01); *G02B 27/0031* (2013.01);
(Continued)

(58) Field of Classification Search
CPC ......... H04N 1/1135; H04N 1/12; B41J 2/473; G02B 26/123; G03G 15/0435; G03G 15/326
See application file for complete search history.

(56) References Cited

U.S. PATENT DOCUMENTS

| 4,984,881 A | 1/1991 | Osada et al. |
| 5,548,437 A | 8/1996 | Yoshimoto et al. |

(Continued)

FOREIGN PATENT DOCUMENTS

| CN | 1614459 | 5/2005 |
| JP | 02102915 | 4/1990 |

(Continued)

OTHER PUBLICATIONS

Jung, Y. H., et al. "Reduction of aero-acoustic noise originating from a high-speed polygon mirror scanner motor in a laser beam printer utilizing air-flow analysis." Microsystem technologies 17, No. 5-7 (2011): 771-776.

*Primary Examiner* — Walter L Lindsay, Jr.
*Assistant Examiner* — Jessica L Eley
(74) *Attorney, Agent, or Firm* — HP Inc. Patent Department

(57) ABSTRACT

According to one example, there is provided an imaging system that comprises a housing, a rotatable polygon comprising multiple mirrored facets located in the housing, a laser to generate a laser beam to shine onto the polygon mirror and to reflect onto a target, and wherein, in use, the density of gas within the housing is such that turbulence-related optical distortion within the housing is not greater than a predetermined limit.

11 Claims, 4 Drawing Sheets

(51) Int. Cl.
  *G03G 15/04* (2006.01)
  *G02B 27/00* (2006.01)
  *G03G 21/20* (2006.01)
  *G03G 15/10* (2006.01)
  *G03G 15/11* (2006.01)

(52) U.S. Cl.
  CPC ....... *G03G 15/0409* (2013.01); *G03G 15/104* (2013.01); *G03G 21/20* (2013.01); *G03G 15/11* (2013.01); *G03G 2215/0626* (2013.01)

(56) References Cited

U.S. PATENT DOCUMENTS

| | | | |
|---|---|---|---|
| 5,650,674 | A | 7/1997 | Hayashi |
| 5,726,699 | A | 3/1998 | Itami et al. |
| 6,285,482 | B1 * | 9/2001 | Date ................... G02B 26/121 |
| | | | 359/196.1 |
| 6,424,447 | B1 | 7/2002 | Kaneko et al. |
| 6,580,186 | B1 | 6/2003 | Suzuki et al. |
| 2002/0181065 | A1 | 12/2002 | Hosonuma |
| 2007/0058235 | A1 | 3/2007 | Nagase |
| 2009/0185249 | A1 * | 7/2009 | Obi .................... G02B 26/0816 |
| | | | 359/198.1 |
| 2010/0091083 | A1 | 4/2010 | Itami et al. |
| 2011/0025813 | A1 * | 2/2011 | Suzuki .................... B41J 2/473 |
| | | | 347/224 |

FOREIGN PATENT DOCUMENTS

| | | |
|---|---|---|
| JP | H04-040213 | 4/1992 |
| JP | 05134203 | 5/1993 |
| JP | 9066629 | 8/1995 |
| JP | 08121471 | 5/1996 |
| JP | H08-121471 | 5/1996 |
| JP | 09066629 | 3/1997 |
| JP | H09105880 | 4/1997 |
| JP | 10105010 | 4/1998 |
| JP | 10221633 | 8/1998 |
| JP | 2006072038 | 3/2006 |
| JP | 2009244742 | 10/2009 |

* cited by examiner

IMAGING AND PRINTING SYSTEM

BACKGROUND

Some printing systems, such as electrostatic printing systems, include an optical imaging system to generate a latent electrostatic image representing an image to be printed on a photoconductor member.

Such imaging systems typically use a rotating polygon mirror that causes a fixed laser beam to scan across a width of a charged photoconductor member, whilst modulation of the laser beam in accordance with an image to be printed causes selective locations on the photoconductor to be discharged.

BRIEF DESCRIPTION

Examples will now be described, by way of non-limiting example only, with reference to the accompanying drawings, in which.

DETAILED DESCRIPTION

Liquid electro-photographic (LEP) printing systems, such as Hewlett Packard's Indigo range of LEP printers, have been using laser imaging systems and rotating polygon mirrors for many years. Similar laser imaging systems are also used in other printing systems, such as in some dry toner laser printers.

FIG. 1 is simplified plan view diagram illustrating how a rotating polygon mirror may be used to repeatedly scan a laser beam across a target, such as a portion of a photoconductor element of a printing system.

Figure 1A:
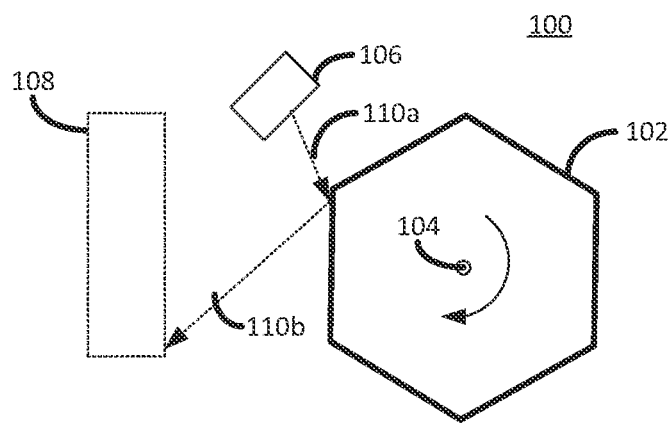
FIGS. 1a and 1b are illustrations of an imaging system according to an example.
Figure 1B:
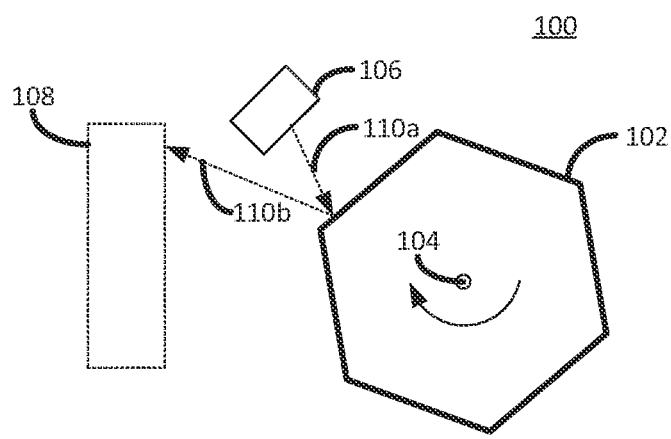

In FIGS. 1a and 1b there is shown an imaging system 100 of a printing system. The imaging system 100 comprises a polygon mirror 102 rotatable about an axis 104. The polygon mirror 102 shown in FIG. 1 is a hexagonal mirror having mirrors on each of its six facets. In other examples, however, other polygon shapes may be used.

A laser imaging system 106 emits a stationary incident laser beam 110a onto the mirror 102. The mirror 102 causes a reflected laser beam 110b to be reflected from a facet mirror onto a target, such as a photoconductor member 108. The angle between the incident laser beam 110a and the reflected laser beam 110b is dependent on the angle between the incident laser beam 110a and the angle of the facet mirror. Thus, as the mirror 102 rotates the reflected laser beam 110b scans from a first side of the photoconductor member 108 to the opposite side thereof. During each scan modulation of the laser beam in accordance with an image to be printed causes selective locations on the photoconductor to be discharged.

As the incident laser beam 110a is received onto a new facet mirror as the mirror 102 rotates, the reflected laser beam 110b returns to the first side of the photoconductor member 108.

The speed at which a polygon mirror is rotated determines the speed at which a laser may be scanned across the surface of a photoconductor member, and this has a direct impact on the overall printing speed of a printing system.

When a polygon mirror is rotated at high speed (for example in excess of 10000 RPM) the air flow around the polygon mirror becomes highly turbulent and may consequently generate substantial noise.

Although the term 'air' is generally used herein, it will be understood that, in certain contexts, the term 'air' may encompass the broader term 'gas'.

It is common for polygon mirrors to be enclosed in a housing. This may be done for a variety of reasons that may include: reducing energy consumption; reducing noise; limiting contamination of the mirrors; and for safety reasons.

In desktop laser printers, which are generally designed for use in quiet office environments, the amount of noise generated has to be below acceptable levels. To achieve acceptable noise levels further noise reduction techniques, such as use of acoustic insulation, may be used to reduce noise generated by a rotating polygon mirror.

In larger printing systems, such as those intended for use in a more industrial environment, the noise generated by a rotating polygon mirror may be considered insignificant compared to other noises generated by such printing systems. Accordingly, in industrial printing systems noise resulting from rotating polygon mirrors is generally not considered problematic, and hence such printing systems may not address the problem of noises generated by a rotating polygon mirror.

Figure 2:
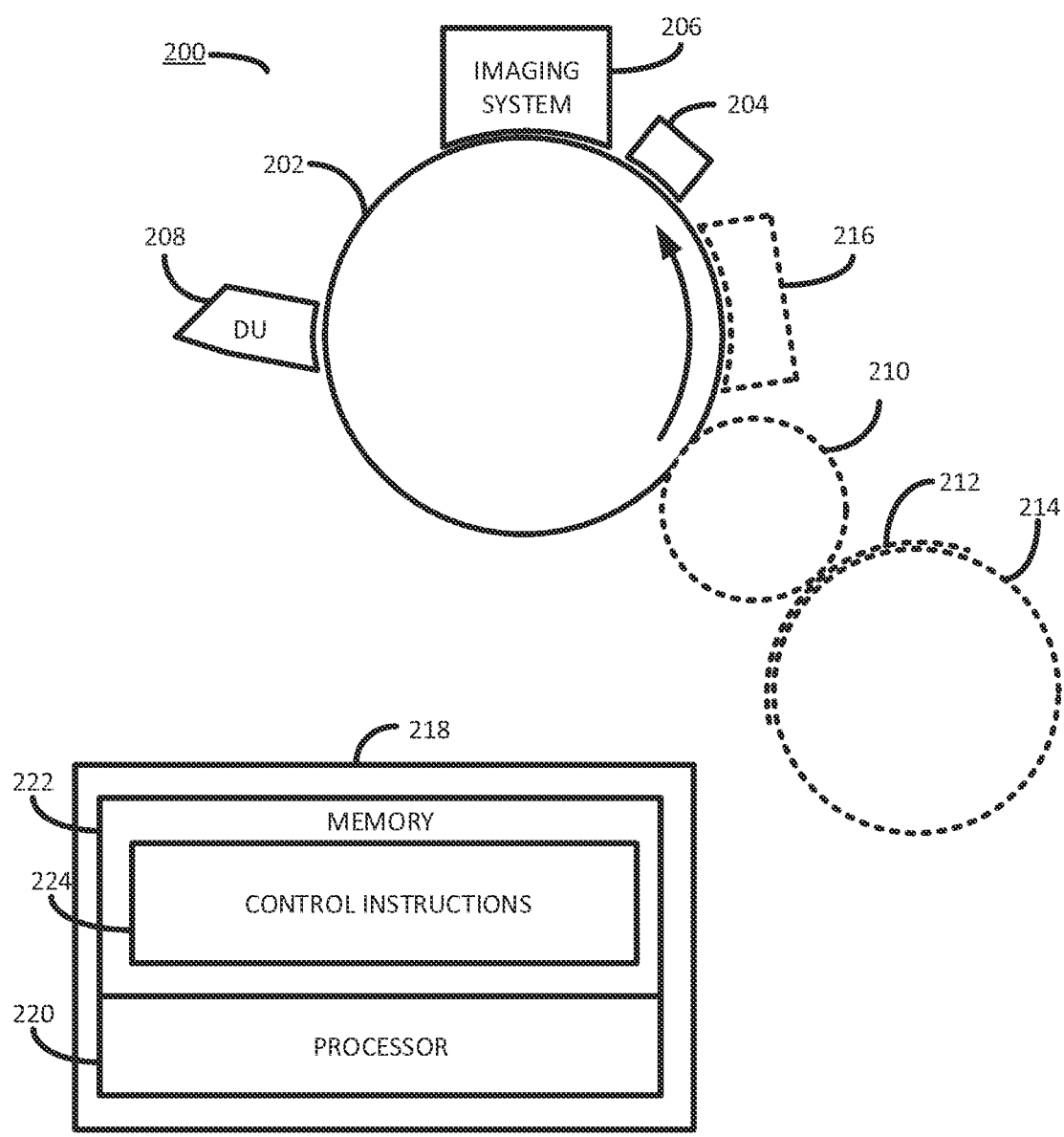
FIG. 2 is a simplified side-view illustration of a liquid electro-photographic (LEP) printing system according to one example.

Referring now to FIG. 2 there is shown a simplified illustration of a liquid electro-photographic (LEP) printing system according to one example. Although the examples described herein relate to LEP printing systems, the techniques described may also be used, with any appropriate modifications, to other electrostatic printing systems, such as dry-toner laser printers.

The printing system 200 comprises a photoconductor member 202. In the example shown the photoconductor member 202 is in the form of a drum, although in other examples the photoconductor member 202 may have a different form, such as a continuous belt or any other suitable form. In operation the photoconductor member 202 rotates in the direction shown by the arrow.

A charging unit 204 is provided to generate a substantially uniform electrical charge on surface of the photoconductor member. In one example the generated electrical charge may be in the range of about 800 to 1100 V.

An imaging system 206 is provided to selectively dissipate electrical charge on the photoconductor member 202 by selectively emitting light onto the surface of the photoconductor member 202. In one example the imaging system 206 includes at least one laser and a rotating polygon mirror. The imaging system 206 selectively dissipates charge in accordance with an image to be printed, or more precisely, in accordance with an image that represents a single color separation, or single color channel, of the image to be printed.

The imaging system thus creates a latent electrostatic image on the surface of the photoconductor member 202 that comprises charged areas and non-charged areas that correspond to portions of the image that are to receive toner, and portions of the image that are not to receive toner.

A developer unit 208 is provided to electrostatically transfer liquid toner stored within the developer unit 208 to the surface of the photoconductor member 202 in accordance with the latent image thereon. The liquid toner may comprise charge directors. Once an image has been developed on the photoconductor member 202 the image may be electrostatically transferred to an intermediate transfer member 210, such as a blanket member, for onward transfer, under pressure from an impression roller 214, to a media 212. In other examples the image developed on the photoconductor member 202 may be transferred directly to a media without the use of an intermediate transfer member 210.

In some examples a cleaning unit 216 may be provided to remove any traces of toner remaining on the surface of the photoconductor member 202 after transfer of the image to the intermediate transfer member 210 or after direct transfer to a media, as well as to dissipate any residual electrical charges on the surface of the photoconductor member 202.

It should be noted that, depending on the size of the photoconductor member 202 and the size of the image to be printed a latent image corresponding to just a portion of the image to be printed may be present on the photoconductor member 202 at any one time.

In the example shown in FIG. 2 a single developer unit 108 is provided. In other examples a printing system 200 may comprise multiple developer units, for example one for each of the colored toners the printing system is configured to operate with.

Each developer unit may be retractably engaged, such that each developer unit may engage with the photoconductor member 202 to apply toner to the photoconductor member 202 when a latent image of a corresponding color separation is generated on the photoconductor member 202. For example, when a latent image of a cyan color separation is generated on the photoconductor member 202, a developer unit containing cyan toner is engaged with the photoconductor member 202, whilst any other developer units are in a retracted position.

The operation of the printing system 200 is generally controlled by a printer controller 218. The printer controller 218 comprises a processor 220, such as microprocessor, coupled to a memory 222 through an appropriate communications bus (not shown). The memory 222 stores printing system control instructions 224. The controller 218 may execute the instructions 224 to cause the printer controller 218 to operate a printing system as described herein.

Increasing the productivity of printing systems is an important goal for many printer manufacturers. In line with this goal, the printing system 200 is configured to print on media up to B2 size (up to 760 mm). For comparison, previous printing systems, such as the range of HP Indigo series 3 digital presses, were able to print on media up to A3 size (up to 320 mm).

The printing system 200 may therefore enable substantially productivity increases to be achieved compared to previous printing systems.

Earlier printing system, such as the HP Indigo series 3 digital presses, print with a resolution of 32 pixels per millimeter giving, on a media 320 mm wide, a total of 10240 resolvable pixels. In such systems, the angle of the reflected laser beam (as reflected from a polygon mirror) between resolvable pixels equates to about $d\Theta_{pix}$=19 arcseconds.

Figure 3:
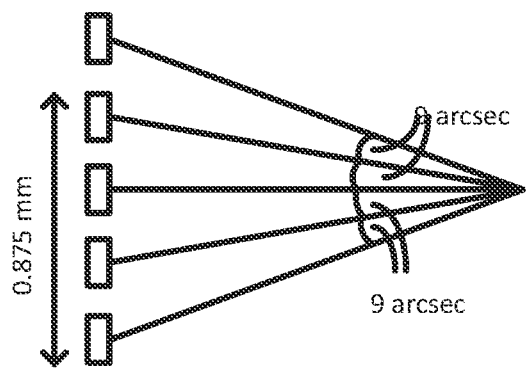
FIG. 3 is an illustration of angles of a laser beam reflected from a polygon mirror between resolvable pixels according to one example.

The example printing system 200 also prints with a resolution of 32 pixels per millimeter giving, on a media 760 mm wide, a total of 24320 resolvable pixels. Accordingly, the angle of the reflected laser beam (as reflected from a polygon mirror) between resolvable pixels equates to about $d\Theta_{pix}$=9 arcseconds, as illustrated in FIG. 3.

Figure 4:
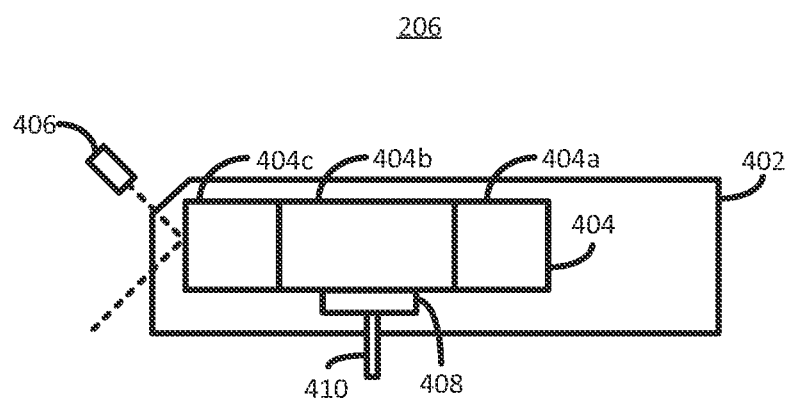
FIG. 4 is a simplified side view of an imaging system according to one example.

Referring now to FIG. 4 there is shown a more detailed side-view illustration of the imaging system 206 according to one example. The imaging system 206 comprises a housing 402 within which is located a hexagonal polygon mirror 404. The housing 402 is a generally closed housing. The mirror 404 comprises six facet mirrors, of which facet mirrors 404a, 404b, and 404c are visible in FIG. 4. The mirror 404 is coupled to a drive shaft 410 through a bearing 408. The drive shaft 410 is coupled to a drive unit (not shown) such as an electric motor. A laser 406 generates a laser beam that is reflected off the mirror 404 onto a photoconductor member, such as photoconductor member 202 shown in FIG. 2. In the examples described herein the incident and reflected beams lie in the plane perpendicular to polygon mirror rotation axis. In one example the housing 402 comprises one or multiple portions (not shown) that are transparent to the laser beam generated by the laser 406 window. This enables, for example, both the incident and reflected laser beam to pass through the transparent housing portions without substantial modification of the incident and reflected laser beams.

In use the mirror 404 may be rotated at a speed in excess of 20000 RPM. For example, to enable the laser 406 to scan across a B2-size media in the same time as previous printing systems scan across an A4-size media, in one example the mirror 404 may be rotated at a speed of about 26800.

To facilitate such high-speed rotation, the polygon mirror 404 is mounted on an air bearing 408, such as a spiral-groove air bearing. The air bearing 408 generates its own air cushion during rotation, resulting in a low-friction bearing. In the example shown the air bearing 408 is located within the housing 402.

It was discovered, however, that printing using the current printing system gave rise to image quality problems not present on previous printing systems, notably the appearance of random variation of printed image intensity between successive image lines created by different facets of the polygon mirror.

After much investigation, and after elimination of possible causes such as mirror surface inaccuracies, it was determined that the increased sensitivity of the imaging system to enable printing with the same high resolution but on significantly wider format medias had made the imaging system sensitive to optical distortions caused by the turbulence generated within the housing 402 during rotation of the polygon mirror 404.

For example, it was determined that the Reynolds number of the turbulent air within the housing 402 during high-speed rotation of the polygon mirror 404 is much greater than 1. Furthermore, it was determined that air pressure within the turbulent air varies by up to about 10%. This in turn causes variations in the refractive index of air, in the region of around:

$$dNrefr=3\times10^{-5}.$$

This variation in refractive index has a corresponding effect of the laser beam passing through this air.

The estimated effect of turbulence on the laser beam wavefront can be estimated as:

$$OPD=dNrefr*D_{beam}$$

where OPD is optical path difference, $D_{beam}$ is beam width which gives good approximation of optical path length in an area of turbulent air. This results in the angular beam deviation due to turbulence to be estimated as:

$$\alpha_{turb}=OPD/D_{beam}=dNrefr=\sim3e\text{-}5=6 \text{ arcsec}$$

Accordingly, the inventors have determined that where:

$$\alpha_{turb}>\sim d\Theta_{pix}/2$$

there is a likelihood that turbulence generated by a rotating polygon mirror will adversely affect a laser beam passing through the turbulence.

In the present example, the number of resolvable pixels $N_{res}$ may be given by:

$$N_{res}=L_{format}/(25.4/N_{dpi})$$

where $L_{format}$ is the print format width (760 mm in the present example), and $N_{dpi}$ is basic pixel addressability (813 dpi in the present example).

Beam full scan angle after polygon may be given as $$\Theta_{scan}=2*(2\pi/N_{fac})*\text{DutyCycle}$$

where $N_{fac}$ is number of polygon facets (6 in our case), DutyCycle is portion of full facet scan utilized for printing (in the present example about 0.5)

Angular step between neighbouring pixels in the space of reflected polygon beam may be given as:

$$d\Theta_{pix}=\Theta_{scan}/N_{res}=2*(2\pi/N_{fac})*\text{DutyCycle}*(25.4/N_{dpi})/L_{format}$$

In the present example, $d\Theta_{pix}=4.3*10^{-5}=8.9$ arcseconds which indicates that the imaging system 206 is susceptible to optical distortions caused by air turbulence generated as the mirror 404 rotates.

The inventors have determined that turbulence-related optical distortion may be problematic in cases when $d\Theta_{pix}<=\sim10$ arcseconds.

A number of examples will now be described which aim to reduce, or even eliminate the aforementioned optical distortion effects due to air turbulence caused by a rotating polygon mirror. The inventors have determined that this may be achieved by reducing the density of the gas within the imaging system housing such that turbulence-related optical distortion within the housing does not adversely affect a laser beam passing through the turbulence. By adversely affect is meant that the degree of any optical distortion is not greater than a predetermined limit.

Figure 5:
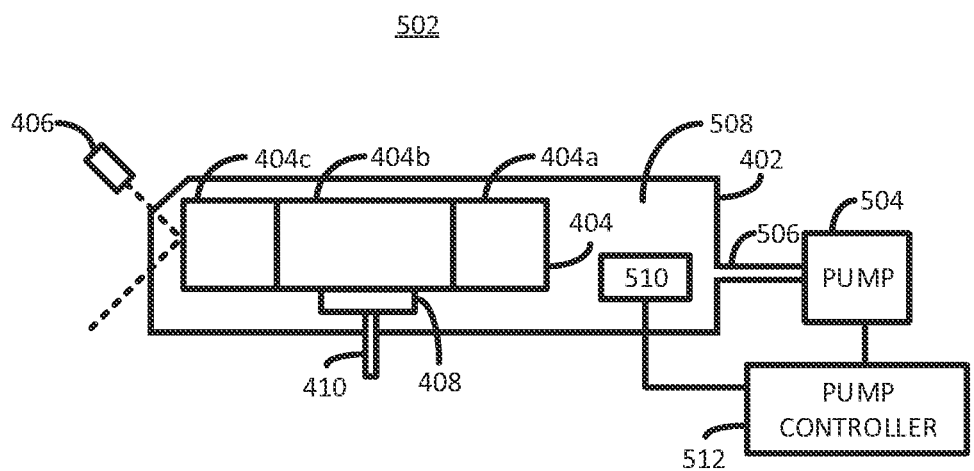
FIG. 5 is a simplified side view of an imaging system according to one example.
Figure 6:
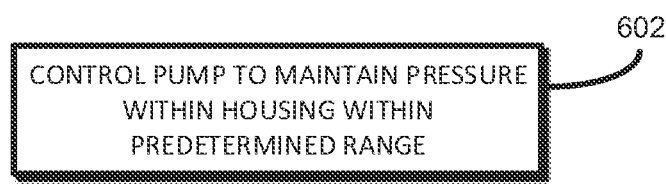
FIG. 6 is diagram illustration operation of an imaging system according to one example.

In one example, illustrated in FIG. 5, the housing 402 of an imaging system 502 is constructed to be largely or fully hermetic. By largely hermetic is meant that small amounts of air leakage are permissible, without affecting the operation of the imaging system, as described below. The imaging system 502 comprises, in addition to those elements shown in FIG. 4, an air pump 504 in fluid communication, through a conduit 506, with air 508 within the housing 402. The pump 504 is to remove air from the housing 402 so as to reduce the air pressure, and hence reduce the air density, within the housing 402. In one example a pressure sensor 510 is provided within the housing 402. A pump controller 512 controls operation of the pump 504 in accordance with signals generated by the pressure sensor 510, as shown in FIG. 6 in a closed-loop feedback system. In one example, the pump controller 512 controls the pump 512 to maintain the air pressure within housing 402 at a predetermined level or within a predetermined range. In one example the predetermined level or range may be within the region of about 0.1 to 0.2 atmospheres.

In another example no pressure sensor 510 may be used and the pump 504 may be configured to operate at a predetermined rate that has been determined to lower the air pressure within the housing 402 by a predetermined amount.

Reducing the air pressure within the housing 402 helps reduce the effect of any air turbulence within the housing 402 when the polygon mirror 404 is rotating at high-speed since the air refractivity is roughly proportional to its density. It should be noted, however, than reducing air pressure within the housing 402 does not prevent the turbulence, but rather helps mitigate the optical distortion effects of any turbulence.

However, the amount of pressure reduction within the housing 402 may be based on the optical sensitivity of the imaging system. For example, in some examples the air pressure within the housing 402 may be reduced by the minimum amount needed, with a suitable buffer amount if appropriate, to mitigate the effects of any optical distortion on a laser beam caused by turbulence of a rotating polygon mirror for a given imaging system optical sensitivity.

It should also be noted that, due to the presence of the air bearing 408 within the housing 402 it is not appropriate to reduce the air pressure below about 0.1 atmospheres, as doing so may impact the effectiveness of the air bearing 408.

Figure 7:
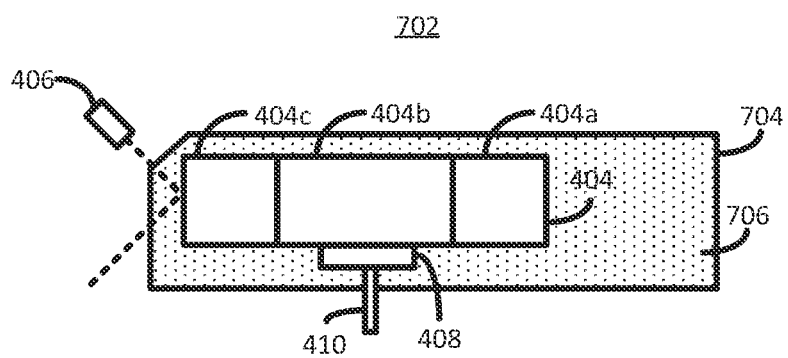
FIG. 7 is a simplified side view of an imaging system according to one example.

A further example of an imaging system is illustrated in FIG. 7. The imaging system 702 has the same elements as the imaging system 206 illustrated in FIG. 4. However, the housing 704 is hermetic to a high degree, and the housing 706 is filled with a lighter than air gas or gaseous mix. In one example the housing 706 is filled with a lighter than air gas at a pressure substantially the same as atmospheric air pressure. Having the housing 704 filled with a lighter than air gas helps reduce the above-described effect of any air turbulence within the housing, since the gas refractivity is roughly proportional to its density. It should be noted, however, having the housing 704 filled with a lighter than air gas does not prevent turbulence, but rather helps mitigate the effects of any turbulence.

In one example the housing 704 is filled with a mix of a lighter than air gas and air. The proportions of air and lighter than air gas of the mix may be determined so that the effects of any turbulence on the imaging system are suitably mitigated for a given imaging system sensitivity. For example, in one example a mix of 50% helium and 50% air may be used, although in other examples other proportions could be used.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:
1. An imaging system, comprising:
a housing;
a rotatable polygon comprising multiple mirrored facets located in the housing;
a laser to generate a laser beam to shine onto the polygon mirror and to reflect onto a target;

wherein, in use, the density of gas within the housing is such that turbulence-related optical distortion within the housing is not greater than a predetermined limit, wherein the housing is hermetic or substantially hermetic, and wherein the imaging system further comprises:
a pump connected to the housing through a conduit; and
a pump controller to control the pump to remove air from the housing to reduce the air pressure within the housing to a predetermined level.

2. The imaging system of claim 1, wherein the air pressure is reduced to a level such that turbulence-related optical distortion within the housing does not adversely affect a laser beam passing through the turbulence.

3. The imaging system of claim 2, wherein the pump controller controls the pump to reduce the air pressure within the housing to not below about 0.1 atmospheres.

4. An electrostatic printing system, comprising:
an imaging system housing;
a rotatable polygon comprising multiple mirrored facets located in the housing;
a laser to generate a laser beam to shine onto the polygon mirror and to reflect onto a photoconductor member;
wherein the density of gas within the housing is such that, when the mirror is rotating at high-speed, turbulence-related optical distortion within the housing does not adversely affect the laser beam, and
wherein the housing is hermetic to a high degree, and the printing system further comprises:
a pump in fluid communication with gas within the housing; and
a pump controller to control the pump to reduce the pressure within the housing to within a predetermined range.

5. The printing system of claim 4, wherein the pump controller is to control the pump to reduce the pressure within the housing to a pressure between 0.1 and 0.2 atmospheres.

6. An electrostatic printing system, comprising:
an imaging system housing;
a rotatable polygon comprising multiple mirrored facets located in the housing;
a laser to generate a laser beam to shine onto the polygon mirror and to reflect onto a photoconductor member;
wherein the density of gas within the housing is such that, when the mirror is rotating at high-speed, turbulence-related optical distortion within the housing does not adversely affect the laser beam, and
wherein the housing is hermetic and is filled with a lighter than air gas or gaseous mix.

7. An imaging system, comprising:
a sealed housing;
a rotatable polygon mirror comprising multiple mirrored facets located in the housing;
a portion of the housing transparent to a laser;
a laser to generate a laser beam to shine through the transparent portion of the housing onto the polygon mirror and to be scanned by the polygon mirror over a target;
wherein, in use, a density of gas within the housing is reduced below atmospheric pressure to reduce turbulence-related optical distortion within the housing.

8. The imaging system of claim 7, further comprising an air bearing supporting rotation of the polygon mirror in the sealed housing.

9. The imaging system of claim 7, further comprising:
a pump to remove gas from within the housing;
a pressure sensor in the housing; and
a pump controller to receive output from the pressure sensor and control operation of the pump based on the output of the pressure sensor.

10. The imaging system of claim 9, wherein the pump controller to maintain pressure in the sealed housing between 0.1 and 0.2 atmospheres based on output from the pressure sensor.

11. The imaging system of claim 7, wherein a gas within the sealed housing is a lighter-than-air gas to provide the density reduced to below atmospheric pressure.

* * * * *